(No Model.)
J. G. MAARDT.
COVERING FOR STEAM BOILERS, &c.
No. 321,233. Patented June 30, 1885.
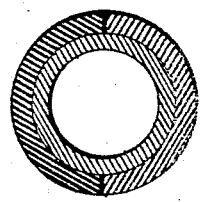
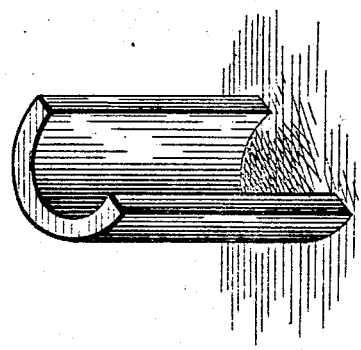
Witnesses
Inventor
Jörgen G. Maardt,
By his Attorneys
Louis Bagger & Co.

UNITED STATES PATENT OFFICE.

JÖRGEN GEORG MAARDT, OF COPENHAGEN, DENMARK.

COVERING FOR STEAM-BOILERS, &c.

SPECIFICATION forming part of Letters Patent No. 321,233, dated June 30, 1885.

Application filed May 11, 1885. (No model.)

*To all whom it may concern:*

Be it known that I, JÖRGEN GEORG MAARDT, a subject of the King of Denmark, residing at Copenhagen, in the Kingdom of Denmark, have invented a certain new and useful Fire-Proof Composition for Covering Steam-Boilers, Steam-Pipes, and for similar purposes; and I do declare the following to be a full, clear, and exact description of the invention, such as will enable others skilled in the art to which it appertains to make and use the same.

My invention has relation to that class of protective coatings or coverings for steam-boilers, steam-pipes, heating-pipes, &c., which are designed to prevent undue radiation of heat from the coated or covered surface, while at the same time it forms a protection against rust or corrosion; and it consists in an improved fire-proof composition, which is adapted to be molded into any desired shape, so as to fit the conformation of the surface for which it is intended, substantially as will be hereinafter more fully described and claimed, reference being had to the accompanying drawings, in which—

Figure 1 represents a section of the molded packing, adapted to fit a steam-pipe, and Fig. 2 is a cross section of a pipe provided with the packing.

To prepare this composition, I mix a suitable quantity of sawdust, pulverized cork, pulverized bark—such as spent bark from tan-yards—rice-hulls, bran, or any light material of a similar nature, with a suitable quantity of soluble glass, either silicate of soda, silicate of potash, or a mixture of both, to form a soft mass of a consistency like cream or gruel. To this mixture I now add a suitable quantity of pulverized chalk or slaked lime, to form a plastic mass of such consistency that it may easily be molded by pouring or pressing it into suitable molds. This mass, before molding it, is thoroughly worked through, by suitable machinery, so as to thoroughly incorporate its several ingredients and form a homogeneous plastic mass, which is molded, by any desired method or means, into shapes adapted to fit the surface of the boiler, steam-pipe, or other object upon which it is to be placed. After the material has dried, it is removed from the molds, and boiled in a strong solution of chlorcalcium, chlormagnesium, chlorbarium, or any similar chemical solution which will cause the shaped pieces to "set" or harden. Next the pieces, after this boiling process, are subjected to a lixiviating process by submitting them to a thorough washing with boiling water, for the purpose of dissolving and removing all the soluble salts with which they have become impregnated. After this washing, the parts are ready to be applied to the object for which they are intended without further treatment; and if made in sections the several sections may be united by cementing them together, or in any other suitable manner.

This composition is not only a perfect non-conductor of heat; but it is absolutely fire-proof, and will not corrode.

Having thus described my invention, I claim and desire to secure by Letters Patent of the United States—

A compound or composition for making fire-proof covering or coating for steam-boilers, steam-pipes, and for similar purposes where it is desired to prevent undue radiation of heat, the same consisting of a mixture of sawdust or similar comminuted material, soluble glass, and chalk or slaked lime, molded into suitable shapes, then boiled in a solution of chlorcalcium or its chemical equivalent, and then lixiviated to remove the soluble salts by treating or washing with boiling water, substantially as set forth.

In testimony whereof I have hereto affixed my signature in presence of two witnesses.

JÖRGEN GEORG MAARDT.

Witnesses:
JULIUS FREDERIK SELLERUSS,
VYZO CARL PROSCH.